Figure 1:
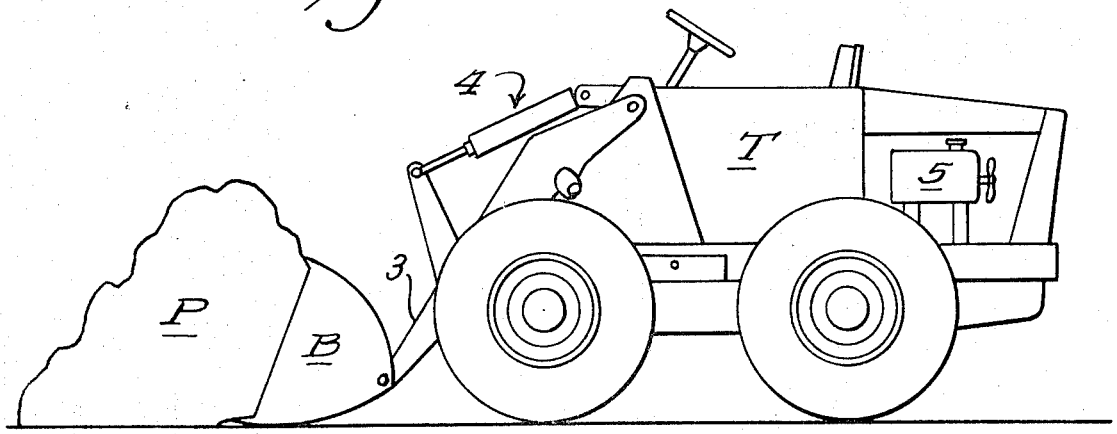

United States Patent

[11] 3,542,228

| [72] | Inventor | Rudolf Horsch |
| | | Burlington, Iowa |
| [21] | Appl. No. | 711,695 |
| [22] | Filed | March 8, 1968 |
| [45] | Patented | Nov. 24, 1970 |
| [73] | Assignee | J.I. Case Company |
| | | a corporation of Wisconsin |

[54] HYDROSTATIC CONTROL DEVICE FOR LOADER TRACTOR
8 Claims, 2 Drawing Figs.

[52] U.S. Cl. .................................................. 214/762, 60/52
[51] Int. Cl. .................................................. E02f 3/70
[50] Field of Search .................................................. 214/140, 762, 763, 764, 778; 60/52V.S.P., Inq

[56] References Cited
UNITED STATES PATENTS

| 3,095,990 | 7/1963 | Granryd | 214/762 |
| 3,148,790 | 9/1964 | Ziskal | 214/762 |
| 3,237,794 | 3/1966 | Miller | 214/778 |

*Primary Examiner*—Hugo O. Schulz
*Attorney*—Dressler, Goldsmith, Clement & Gordon ABSTRACT: A control system is disclosed for a motor vehicle having a hydrostatically driven drive means and auxiliary hydrostatically driven power-consuming equipment which operates off of the same motor as the power train. A conduit leads from a pressurized fluid region of the hydrostatic drive of the auxiliary equipment to an operating chamber of a piston and cylinder arrangement so that the pressure of hydraulic fluid in the above work-performing region is reflected in the operating chamber as pressure against the piston. The piston has a shaft extending axially through and out of the cylinder, away from the operating chamber, plus a spring which resists motion of the piston in response to pressure in the operating chamber. When the auxiliary equipment is engaging a heavy load, the hydraulic pressure in the work-performing region and the operating chamber will be high, compressing the piston against the spring and causing the shaft to extend farther out of the cylinder. Under these circumstances, the shaft strikes a lever which operates as the throttle for the drive means and moves it to throttle down the power consumption of the power train, thus making more power from the motor available for use by the auxiliary equipment.

Patented Nov. 24, 1970  3,542,228

Inventor
Rudolf Horsch
By Dressler, Goldsmith,
Clement & Gordon
Attys.

HYDROSTATIC CONTROL DEVICE FOR LOADER TRACTOR

BACKGROUND OF THE INVENTION

This application relates to a motor vehicle having automatic drive means and hydrostatically operated auxiliary equipment, which constitutes separate power-consuming loads that are to operate from the same engine. More particularly, this application relates to a system for balancing the power of the engine between the two power-consuming systems in response to the demands of one of the systems.

Tractor-loader vehicles often have hydrostatically operated drive means and scoop shovels, or buckets, both of which systems obtain their power from the same motor. A common mode of operation of this type of loader is to drive the tractor with the bucket sliding along the ground into a pile of particulate material until the resistance of the bucket going into the pile stops the movement of the tractor. At this time, a maximum energy requirement for the vehicle exists while the vehicle is operated to tilt the bucket to break a portion of the material loose from the pile and to begin to raise it. This is so because, at this point, both the scoop shovel system and the drive means are consuming power at essentially their maximum rate, if the operator has not throttled back the drive means of the vehicle. Thus, the engine is in danger of stalling due to the great power demand.

While it would be possible for the operator to disengage the drive to the vehicle drive pump to avoid engine stall and to make full engine power available for the loader bucket, it is highly desirable to free the operator from this difficult technique by providing an instantaneously operable load-balancing control that is able to automatically throttle back on the vehicle drive pump when the load on the bucket increases, thereby balancing the demand and consumption requirements in a fashion to avoid engine stall.

Thus, there is a need for a control arrangement in the form of a simple, rugged, and reliable mechanism capable of automatically throttling down the power requirements of the vehicle drive means in response to peak power demands of the auxiliary system in vehicles which have multiple load systems powered from the same motor.

DESCRIPTION OF THE INVENTION

In accordance with this invention, a motor vehicle having drive means and having auxiliary, hydrostatically driven power consuming equipment, typically a bucket, is provided with a single motor for energizing these mechanisms. The vehicle also has means for varying the rate of consumption of power by the drive means, and means, responsive to hydraulic fluid pressure driving the auxiliary equipment, to control the means for varying the rate of power consumption to reduce the rate of the power consumption by the drive means when the hydraulic fluid pressure in the auxiliary equipment reaches a predetermined value.

This is accomplished in one embodiment of this invention by means of a piston, operable in a cylinder, defining a hydraulic pressure chamber which is connected by a conduit to a pressurized fluid region in the hydraulic drive of the auxiliary equipment. When hydraulic pressure reaches a high value in the drive system of the auxiliary equipment, indicating that the auxiliary equipment is laboring under a very heavy load, the hydraulic pressure is transferred via the conduit into the operating chamber of the piston and cylinder, causing the piston to be moved against a spring. When the hydraulic pressure reaches a predetermined value, at which pressure the piston is driven against the spring to reach a predetermined location, the piston actuates the means for varying the power consumption of the drive system to reduce its consumption, thus making more power available for the auxiliary system.

In the drawings FIG. 1 is a diagrammatic view of a motor vehicle of this invention having a hydrostatically operated bucket shown in the act of "breaking out" a load of dirt or other material from a large pile.

Figure 2:
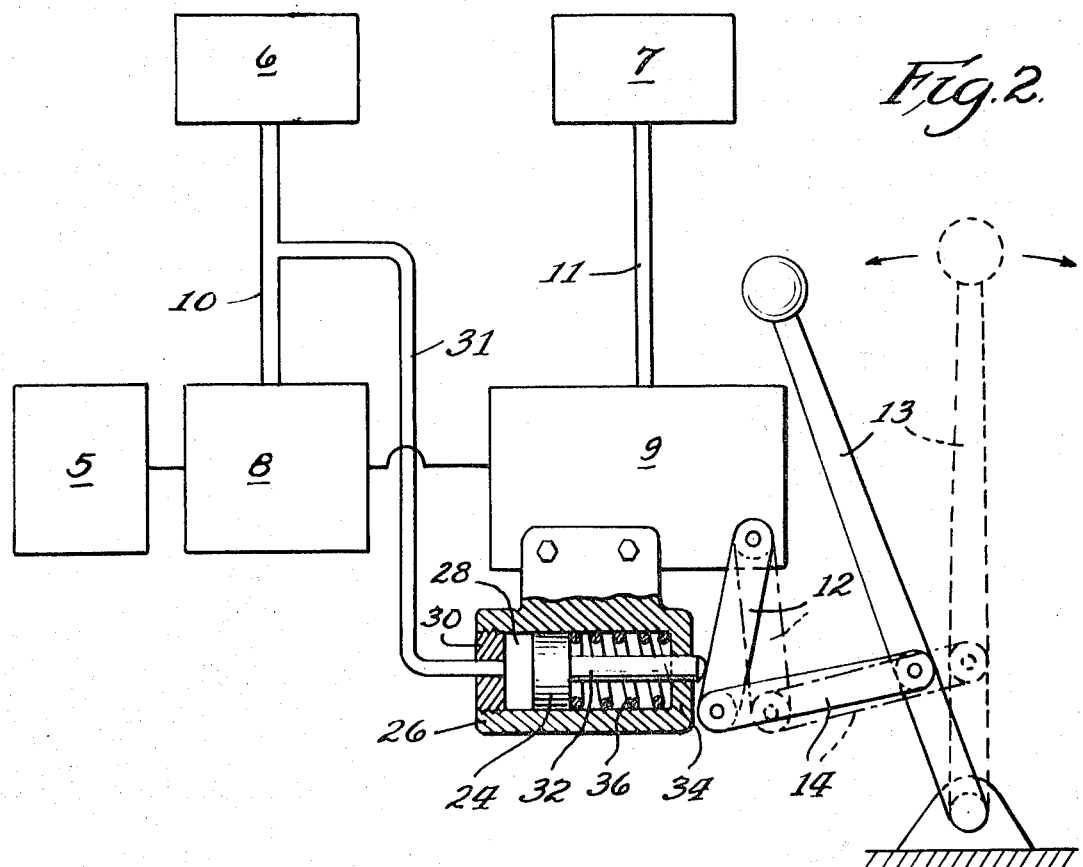

FIG. 2 is a diagrammatic view of one embodiment of the control system of this invention.

Referring now to the drawings, a conventional loader tractor T such as is used in earth-moving operations is shown in FIG. 1 for purposes of illustrative disclosure. Thus, the illustrated tractor loader has a loader system including a bucket B pivotally carried at the end of a loader arm 3 to operate under the control of a hydrostatically powered lift cylinder 4. The tractor has a single drive motor or engine 5 for powering two drive systems incorporated in the vehicle: The loader drive system 6 to operate the bucket and the traction drive system 7 to move the vehicle.

A typical vehicle-energizing system is illustrated in FIG. 2 wherein the engine 5 is shown connected directly to a loader drive pump 8 and a traction drive pump 9. The power-consuming loader drive system 6 as disclosed herein may be of any suitable hydrostatic type, and it is shown connected to the loader pump 8 by means of a fluid conduit 10. The power-consuming traction drive system 7, as represented here, is also shown as being of a hydrostatic type and is shown connected to the traction pump 9 by means of a conduit 11 to apply motive power to the vehicle.

The traction drive pump 9 typically may be a conventional "wobble-pump" in which the flow of pressurized hydraulic fluid to the traction drive system is controlled in accordance with the rotary position of a drive link 12 that is shown connected to operate the internal control mechanism of the pump 9. A floor-mounted hand lever 13 is shown connected to the drive link 12 through an intermediate link 14. When these parts are in the position represented by full lines, the traction pump 9 transmits power to the traction drive system 7 for moving the vehicle forwardly under essentially full power. The dotted line position of the parts represent the neutral position, when no power is transmitted.

The loader tractor in FIG. 1 is shown with the bucket down and being forced forwardly under full traction power to advance into a pile P of dirt or other particulate material. At this point, the loader drive system is actuated by the operator to apply a lifting action to the bucket. The initial lifting load seen by the bucket is frequently augmented by the necessity to break the scooped portion of the material loose from the pile. This particular sequence imposes the maximum load requirement on the loader drive system, and it usually occurs while the traction drive system is under full power.

Piston 24 is slidable in cylinder 26 to define a hydraulic operating chamber 28 which is sealed with plug 30. Hydraulic operating chamber 28 is connected to a region of pressurized hydraulic fluid in the hydraulic drive of the bucket system by means of conduit 31, which is shown in this embodiment to connect with conduit 10. Thus, since there is free flow of hydraulic fluid between the pressurized hydraulic fluid in the drive system 6 of the loader and the hydraulic operating chamber 28, the pressure in chamber 28 will be essentially the same as the pressure of the hydraulic fluid in the drive of the loader system.

Piston 24 carries shaft 32 which passes through an aperture in end wall 34 of cylinder 26. Under the circumstances described below, shaft 32 engages link 12 to move the link out of a position corresponding to a high rate of power consumption by drive train pump 9.

As the vehicle of this invention engages the pile of dirt P, the operator of the vehicle typically applies full power to the loader system to attempt to "break out" bucket B, which contains a load of dirt from the pile P by the lifting action of cylinder 4. As stated before, a maximum power requirement exists at this time, and during this "break out" stage, the hydraulic fluid pressure of pump 8 and the loader drive system 6 will sharply rise, causing the pressure in operating chamber 28 to rise in a corresponding manner.

Piston 24 is thus urged by the pressurized fluid in the direction of drive link 12 against the resistance provided by spring 36. When the hydraulic fluid pressure in the bucket system reaches a predetermined value, piston 24 is advanced by the pressure against the spring to a predetermined position at which shaft 32 engages link 12, when link 12 occupies a position corresponding to a high rate of power consumption for traction pump 9 and drive system 7, to push link 12 to a position corresponding to a lower rate of power consumption.

Thus, as the hydraulic fluid pressure in the bucket system rises to a predetermined pressure in response to the heavy load on bucket B, link 12, link 14, and lever 13 are pushed from the position shown in solid lines to the position shown in phantom lines, at which latter position the traction pump 9 provides little or no pressurized fluid to the traction drive system 7. Thus the power consumption of the traction drive system 7 is reduced, making more power available to the loader drive system 6.

When the "break out" of the bucket B is accomplished, the lower power demand of the loader drive system 6 will result in a reduced hydraulic fluid pressure in chamber 28. Thus piston 24 and shaft 32 will move back again away from link 12, urged by spring 36, and the operator can manually operate lever 13 to energize the drive train once again, if desired.

From the foregoing, it will be observed that numerous variations and modifications may be effected without departing from the true spirit and scope of the novel concept of the invention.

I claim:

1. In a motor vehicle having drive means and having auxiliary, hydrostatically driven, power-consuming equipment, in which both said drive means and said auxiliary equipment are energized by the same motor: first means for varying the rate of power consumption of said drive means; and second means responsive to the hydraulic fluid pressure driving said auxiliary equipment for controlling said first means to reduce the rate of power consumption by said drive means when said hydraulic fluid pressure reaches a predetermined value.

2. In a motor vehicle having a hydrostatically driven drive means and having auxiliary, hydrostatically driven, power-consuming equipment in which both said drive means and said auxiliary equipment are energized by the same motor: means for varying the rate of power consumption of said drive means; a piston slidable in a cylinder to define a hydraulic operating chamber, said piston having means for acting upon said varying means whereby moving said piston to a predetermined position in said cylinder actuates said varying means to reduce the power consumed by said drive means; fluid conduit means for forming a liquid connection between a pressurized fluid region in the hydrostatic drive of said auxiliary equipment and said hydraulic operating chamber to permit hydraulic fluid flow therebetween, whereby the hydraulic fluid pressure in said hydrostatic drive and said hydraulic operating chamber is essentially the same, said fluid urging said piston to said predetermined position to reduce the rate of said power consumption by said drive means when said hydraulic fluid pressure reaches a predetermined value.

3. In the motor vehicle of claim 2, a shaft carried by said piston and extending axially through and out of said cylinder in a direction away from said hydraulic operating chamber; and a control link for varying the rate of power consumption of said drive means, which link is engaged and moved by said shaft to a position corresponding to a lower rate of power consumption for said drive means when said link is in a position corresponding to a high rate of power consumption for said power train and when said piston is moved to said predetermined position.

4. In the motor vehicle of claim 2, spring means to resist motion of said piston toward said predetermined location, to prevent said piston from reaching said predetermined position until the pressure of said hydraulic fluid reaches a predetermined value.

5. A hydrostatically operated tractor loader having an engine; a hydrostatically operated bucket driven from said engine; traction drive means energized by said engine; first means for varying the rate of power consumption of said traction drive means; and second means, responsive to the hydraulic pressure driving said bucket, for controlling said first means to reduce the rate of power consumption by said traction drive means in response to an increase in said hydraulic pressure.

6. A hydrostatically operated tractor loader including a hydrostatically operated bucket, loader arms connected to the tractor and to the bucket, at least one lift cylinder connected to the tractor and to the loader arms for raising and lowering the bucket; an engine; traction drive means energized by said engine; means, energized by said engine, for providing pressurized fluid to said cylinders to raise said bucket; means for varying the rate of power consumption of said traction drive means; a piston slidable in a cylinder to define a hydraulic operating chamber, said piston having means for acting upon said varying means, whereby moving said piston to a predetermined position in said cylinder actuates said varying means to reduce the power consumed by said drive means; fluid conduit means for forming a liquid connection between hydraulic fluid in said lift cylinder and said hydraulic operating chamber, whereby the hydraulic fluid pressure in said lift cylinder and hydraulic operating chamber is essentially the same, the pressurized hydraulic fluid urging said piston to said predetermined position to reduce the rate of power consumption of said traction drive when said hydraulic fluid pressure reaches a predetermined value.

7. In a motor vehicle system of claim 1 said second means including means preventing increases in the rate of power consumption by said drive means until said hydraulic fluid pressure decreases below said predetermined value.

8. A tractor loader as claimed in claim 5 in which said means for varying the rate of power consumption of said traction drive means includes a lever, and linkage means operatively connecting said lever to said traction drive means for controlling the rate of power consumption of said traction drive means in response to movement of said lever; and said second means including shaft means moving into engagement with said linkage in response to an increase in said hydraulic pressure driving said bucket to a predetermined value to move said lever to reduce power consumption of said traction drive means.